Figure 1:
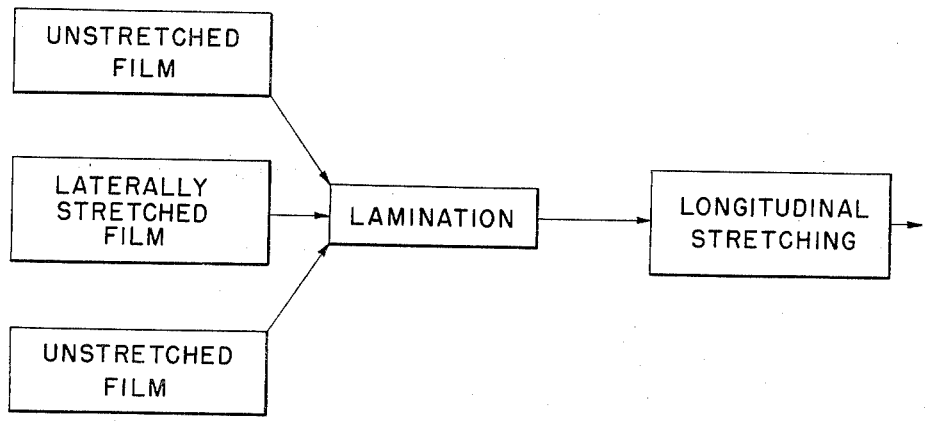

April 22, 1952     J. E. SNYDER ET AL     2,594,229
LAMINATED STRETCHED FILM
Filed July 21, 1950

*INVENTORS*
JAMES E. SNYDER
FOSTER J. YOUNG
BY
ATTORNEY

UNITED STATES PATENT OFFICE 2,594,229

LAMINATED STRETCHED FILM

James E. Snyder, Akron, and Foster J. Young, Cuyahoga Falls, Ohio, assignors to Wingfoot Corporation, Akron, Ohio, a corporation of Delaware Application July 21, 1950, Serial No. 175,254

4 Claims. (Cl. 154—124)

This invention relates to a laminated film of rubber hydrochloride which has high strength at low temperatures while retaining low permeability to moisture vapor. It is relatively stiff so that it can be fed easily into a packaging machine. It has little or no plasticizer content. It is formed from two outer plies of unstretched film with an intermediate ply of film stretched in one direction. These plies are laminated by heat and pressure and the whole is stretched perpendicularly to the aforesaid direction. The outer surfaces of the resulting film have been stretched in one direction, the intermediate portion has been stretched in both directions.

With the advent of frozen foods there has been a demand for a film which is not brittle but has high strength at low temperatures, so that if a package of frozen foods wrapped in the material is dropped or hit, the film will not be broken but will remain intact. Unplasticized rubber hydrochloride film made in the usual manner by casting a cement or solution of rubber hydrochloride on a film-forming surface and then evaporating the solvent becomes brittle at low temperatures. This unplasticized film is therefore not at all satisfactory for the wrapping of frozen foods. It is well known that the addition of plasticizer to a rubber hydrochloride film strengthens the film and somewhat different properties are obtained by adding different plasticizers. Certain plasticizers improve the strength of the film at low temperatures but the addition of any plasticizer decreases the moisture-vapor proofness of the film. The films of this invention are free from plasticizer or contain only a small amount of plasticizer so that the resistance of the film to the passage of water vapor at least approaches that of unplasticized rubber hydrochloride film.

To test the suitability of a film for use at low temperatures it is held taut between 6 inch diameter clamps. A 1 inch diameter steel ball is then dropped on the sample from different heights. The height above which the sample ruptures, and below which it resists the impact, will be referred to herein as drop-height and the resistance of film to bursting under such conditions will be described as the film's drop-height resistance.

Ordinarily, unstretched cast film (formed by evaporating solvent from a cast solution of rubber hydrochloride) has relatively low drop-height resistance. It has been observed that the drop-height resistance of a film is increased by stretching it. For instance, a film which has been stretched to both three times its length and three times its width has appreciably greater drop-height resistance than unstretched film, particularly at low temperatures and has been used satisfactorily for packaging frozen foods. However, such film is quite costly. The laminated film of this invention has good drop-height resistance at low temperatures and is cheaper to manufacture than film which has been stretched in both directions.

References to stretching herein, means sufficient stretching to produce substantial orientation of the molecules or molecular aggregates in the film, i. e., stretching at least one hundred per cent, and usually several hundred per cent, up to six or eight hundred per cent or more.

Figure 2:
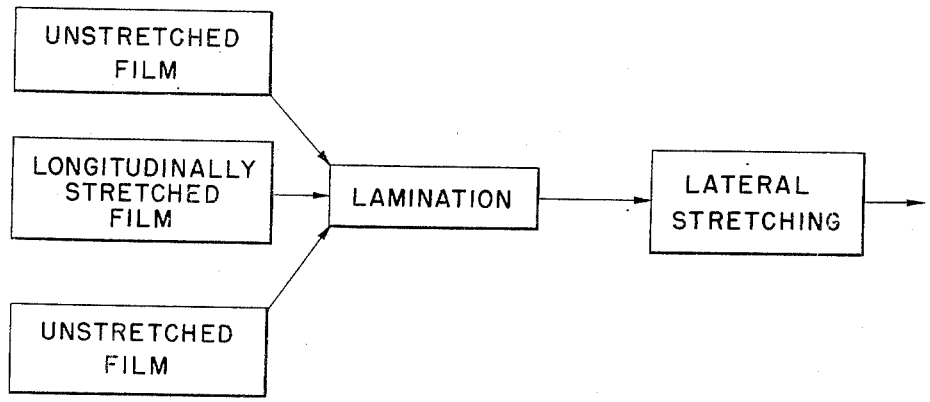

The invention will be further described in connection with the accompanying flow-sheets which illustrate two general methods of producing the film of this invention. Fig. 1 indicates how the film may be produced by laminating three plies of film and stretching the laminated sheet longitudinally, the two outer plies being unstretched and the middle ply being stretched laterally before the lamination and longitudinal stretching. Fig. 2 illustrates the converse operation in which the laminated sheet formed from two outer plies of unstretched film and an intermediate ply of longitudinally stretched film, are stretched laterally after laminating.

Various machines have been devised or suggested for stretching film either longitudinally or laterally. It is desirable to heat the film to somewhat below its melting point before stretching in either direction, and because rubber hydrochloride film is thermoelastic it must be cooled in the stretched condition. The simplest means for stretching longitudinally is to pass the film over a heated roll and from here carry the heated film through two rolls (which may be cool or cooled) having a higher surface speed. The heated film is stretched longitudinally by an amount relative to the difference in the speed of the rolls. Equipment for lateral stretching is described in Young 2,473,404. Any suitable equipment may be used for the stretching operations referred to herein.

In the preferred equipment for lateral stretching a series of arc-shaped rollers is used. Each of these rollers is covered by a rubber sleeve. As the rollers are turned the distance between their ends outside of the arc is always greater than the distance inside of the arc. These arced rollers are placed in a horizontal plane adjacent one another. The film is heated and then passed between the first two rollers. It is kept in contact with the surface of the second roller, coming first into contact with the shorter diameter of the second roller. The roller is rotated in the direction that the film is moving, and because the film is in contact with the rubber sleeve it is stretched laterally as the sleeve stretches laterally in passing from the shorter side to the longer side of the roller. As the film reaches the long side of this roller, it is transferred to the short side of the third roller. It is again stretched laterally as it moves from the short to the long side of this roller. It is then transferred to the fourth roller. Thus, by continuous stretching in contact with the rubber sleeve of each succesive roller, as the sleeve is stretched in being rotated from the short to the long side of its roller, the film is stretched to any desired extent in the crosswise direction.

Stretching tends to orient the molecules or molecular aggregates. This produces a grain which runs in the direction in which the film has been stretched. The film is more easily torn along the grain than across the grain. After the film has been stretched several hundred per cent it can be torn much more easily along the grain than the unstretched film. Conversely, it is more difficult to tear it across the grain.

In producing a preferred film of this invention three films are heated and laminated, and then stretched. Before lamination the outer plies are unstretched, and the intermediate ply is stretched longitudinally. The films may be heated in any usual manner, as by being passed over hot drums, and the films are preferably laminated by pressure between heated pressure rolls before they enter the lateral stretching device. In this lateral stretching device the molecules or molecular aggregates of which the outside unstretched plies are composed, are oriented laterally, and the molecules or aggregates of the intermediate ply which are oriented longitudinally before it enters the lateral stretching device are at least partially reoriented.

Several laminated films were made in this general manner. For some unexplained reason, each resisted decomposition by light for a greater period than unstretched film of the same composition. The drop-heights given for these test films are to be compared with a drop-height resistance of about 1 inch at −20° F. for unstretched, unplasticized film about .001 inch thick. These several rubber hydrochloride films will be described more particularly in what follows.

*Example 1*

The outside plies of this film were each .0012 inch thick and they contained no plasticizer. The intermediate ply likewise contained no plasticizer. It was but .0008 inch thick and was formed by plying up three plies of film each .0008 inch thick and running these through a longitudinal stretcher in which they were laminated to one another by heat and pressure, and stretched to about three times their original length.

These three plies .0012, .0008 and .0012 inch thick, respectively, were then heated to about 190° F. and fed into the lateral stretching device. Here they were heated to about 200° F. and stretched to about three-and-one-half times their original width and reduced in gauge to an overall thickness of .0009 inch. This film had a drop-height resistance of 24 inches at −20° F. It had a water-vapor transfer rate of 1.0 grams per 100 sq. inches in 24 hours, measured by a standard test. It had a life of 92 hours in the Fadeometer, as compared to a usual life of about 40 hours for ordinary cast film of this thickness.

*Example 2*

This film was prepared from (1) two plies of unstretched film .0008 inch thick containing 2.5 parts of butyl stearate per 100 parts of rubber hydrochloride; and (2) an intermediate film about .0015 inch thick containing 5 parts of butyl stearate per 100 parts of rubber hydrochloride, prestretched longitudinally about 300 per cent. The longitudinal ply was prepared by laminating by heat and stretching three plies of .0014 inch thick material. These three plies of stretched and unstretched film, laminated together, were then stretched laterally until the lamination was about .0009 inch thick.

This film had a drop-height resistance of 48 inches at −20° F. Its water-vapor transfer rate was about 1.3 grams per 100 sq. inches per 24 hours. It lasted 81 hours in the Fadeometer.

*Example 3*

In this film the outside plies were each .0008 inch thick and contained no plasticizer. The intermediate ply was .0014 inch thick and contained 5 parts of butyl stearate per 100 parts of rubber hydrochloride. The intermediate ply was formed from three plies of unstretched film each .0014 inch thick, stretched longitudinally to three times their original length. The three plies of stretched and unstretched film were stretched laterally about 350 per cent to a thickness of .00085 inch.

This film had a drop-height resistance of 50 inches at −20° F. It had a water-vapor transfer rate of 1.2 grams per 100 sq. inches in 24 hours.

*Example 4*

In this example the outside plies were each .0008 inch thick and contained 2.5 parts of butyl stearate per 100 parts of rubber hydrochloride. The inner ply was .0014 inch thick and made of film containing 2.5 parts of butyl stearate per 100 parts of rubber hydrochloride. Three plies unstretched film of this composition, .0014 inch thick, united by heat, were stretched longitudinally to three times their original length, to form this intermediate ply. The unstretched and longitudinally stretched films were laminated by heat and stretched laterally until the lamination was .0009-inch thick.

This film had a drop-height resistance at −20° F. of 46 inches and a water-vapor transfer rate of 1.1 grams per 100 sq. inches in 24 hours.

It has been observed that if bags are made from the laminated film of this invention with the stretched outer plies lying across the mouth of the bag, when heat is applied to the mouth, after filling, in order to seal the mouth, the films shrink somewhat, lessening the length of the mouth. If the bags be formed from two rectangular sheets of the laminated stock, or by folding a single sheet of the laminated stock, an ear is formed at each end of the straight-line seal used to close the mouth. It is customary, in heat-sealing stretched film, to maintain it in the stretched condition until the seal has cooled because the heating of the film causes it to shrink. The objectionable "ears" are eliminated by not maintaining the heated mouth of the bag of this film in the stretched condition until it cools.

It is preferred to use film in which there are no more than 10 parts of plasticizer per 100 parts of rubber hydrochloride. Larger amounts of plasticizer tend to make the film become hazy on stretching, and they reduce the resistance of the film to the passage of moisture vapor. Butyl stearate was used in the above films because it is particularly recommended for use in films to be brought in contact with a foodstuff. Other plasticizers may be used, such as any mentioned in the art for use in rubber hydrochloride. Although in the formulae given the two outside films were in each case of the same composition and gauge, this is not essential but it is believed that such film will have less tendency to curl than film made from a lamination in which the outer plies are of different composition or thickness.

In addition to having high strength at low temperatures, the films of this invention have high resistance to the transfer of moisture and are free, or relatively free, from plasticizers and stiff enough to be easily handled on a wrapping machine. In sunlight they last about twice as long as unstretched film. Each of the three films used in making the laminated film of this invention preferably range from about .00075 to .0017 inch thick and the resultant film will ordinarily be stretched to a thickness of at least about .0007 and may be as thick as .0015 or .002 inch up to .0025 inch or thicker. The thicker films are used to obtain greater resistance to moisture vapor, greater strength or increased stiffness.

Increasing the thickness of the intermediate ply, which in the end product is stretched in two directions, increases low-temperature strength proportionally more than increasing the thickness of the outer plies. To improve resistance to moisture vapor permeation, increasing the thickness and/or reducing plasticizer content of any ply is effective. The intermediate ply is more expensive than the outer plies and will be made of the thinnest gauge compatible with the desired results. The edges of the laminated sheet are not true, and several inches must be trimmed from each edge to make a marketable product. The amount of the more expensive intermediate ply required is reduced to a minimum by using a ply which is narrower than the width of the outside plies, so that when trimmed, only a minimum of the inner ply is cut away.

What we claim is:

1. A laminated sheet of rubber hydrochloride film which contains on the average no more than 10 parts of plasticizer for each 100 parts of rubber hydrochloride, the sheet being at least .0007 inch thick, the film on both surfaces being stretched the same amount and in the same one direction, said sheet between its stretched surfaces consisting of an intermediate layer of rubber hydrochloride stretched at least 100 per cent both longitudinally and laterally.

2. The method of producing film which comprises laminating sheets of substantially unstretched rubber hydrochloride to an intermediate ply of rubber hydrochloride stretched at least 100 per cent in one direction, and then stretching the lamination at least 100 per cent perpendicularly thereto.

3. The method of producing a laminated sheet of rubber hydrochloride which comprises laminating rubber hydrochloride film stretched longitudinally at least 100 per cent, between two plies of substantially unstretched rubber hydrochloride film, and then stretching the laminated sheet laterally at least 100 per cent.

4. The method of producing a laminated sheet of rubber hydrochloride which comprises laminating between two plies of substantially unstretched rubber hydrochloride film, a ply of rubber hydrochloride film which has been stretched laterally at least 100 per cent, and then stretching the laminated sheet longitudinally at least 100 per cent.

JAMES E. SNYDER.
FOSTER J. YOUNG.

REFERENCES CITED

The following references are of record in the file of this patent:

UNITED STATES PATENTS

| Number | Name | Date |
|---|---|---|
| 2,004,110 | Head | June 11, 1935 |
| 2,259,347 | Mallory | Oct. 14, 1941 |
| 2,259,362 | Young | Oct. 14, 1941 |
| 2,335,190 | Minich | Nov. 23, 1943 |
| 2,351,350 | Mallory | June 13, 1944 |
| 2,429,177 | Young | Oct. 14, 1947 |